United States Patent
Villano et al.

(10) Patent No.: US 8,583,294 B2
(45) Date of Patent: Nov. 12, 2013

(54) ACTUATION CONTROL SYSTEM

(75) Inventors: William E. Villano, Canton, CT (US);
Kevin Gibbons, Torrington, CT (US);
Teddy L. Jones, Cherry Valley, IL (US);
Francis W. Recck, Rocky Hill, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 304 days.

(21) Appl. No.: 13/083,826

(22) Filed: Apr. 11, 2011

(65) Prior Publication Data
US 2012/0259483 A1 Oct. 11, 2012

(51) Int. Cl.
*F02K 1/76* (2006.01)
*G06F 19/00* (2011.01)

(52) U.S. Cl.
USPC .................................. 701/3; 701/100; 60/228

(58) Field of Classification Search
None
See application file for complete search history.

(56) References Cited

U.S. PATENT DOCUMENTS

| | | | |
|---|---|---|---|
| 4,035,705 A | | 7/1977 | Miller |
| 4,159,444 A | | 6/1979 | Bartlett et al. |
| 4,594,537 A | * | 6/1986 | Arifian et al. ................. 318/564 |
| 4,800,798 A | | 1/1989 | Boldrin et al. |
| 5,206,810 A | * | 4/1993 | Bools et al. ................... 701/100 |
| 6,142,416 A | * | 11/2000 | Markstein et al. .......... 244/53 R |
| 6,195,247 B1 | * | 2/2001 | Cote et al. ..................... 361/253 |
| 7,021,587 B1 | | 4/2006 | Younkin |
| 7,370,468 B2 | * | 5/2008 | Colotte et al. ............... 60/226.2 |
| 2004/0118974 A1 | * | 6/2004 | Colotte et al. ............. 244/110 B |
| 2007/0033435 A1 | | 2/2007 | Stange et al. |
| 2009/0013664 A1 | | 1/2009 | Jones et al. |
| 2010/0313546 A1 | | 12/2010 | Kubiak |
| 2011/0192135 A1 | | 8/2011 | McKay et al. |

FOREIGN PATENT DOCUMENTS

FR 2963948 A1 2/2012

OTHER PUBLICATIONS

Search Report of the UKIPO in Application No. GB1206403.6, dated Jul. 20, 2012.
Corrected Search Report of the UKIPO in Application No. GB1206403.6, dated Aug. 21, 2012.

* cited by examiner

*Primary Examiner* — Michael J Zanelli
(74) *Attorney, Agent, or Firm* — Kinney & Lange, P.A.

(57) ABSTRACT

A dual redundant actuation control system for controlling a plurality of actuators for positioning a plurality of moveable aircraft components. The actuation control system includes a component controller. The component controller includes two component control channels. Each of the plurality of actuators is electrically connected to each of the two component control channels such that either of the two component control channels may control any or all of the plurality of actuators.

18 Claims, 3 Drawing Sheets

ACTUATION CONTROL SYSTEM

BACKGROUND

The present invention relates to aircraft control system. In particular, the invention relates to an actuation control system for components of an aircraft engine.

Aircraft require highly reliable control systems to ensure safe and efficient operation of the aircraft. Reliable control for more sophisticated gas turbine engines is maintained, for example, by a Full Authority Digital Engine Controller (FADEC). A FADEC receives cockpit commands in the form of a signal indicative of a performance level required from an engine. The FADEC also receives signals from a variety of sensors and other systems around the engine and the aircraft. The FADEC applies a set of control rules to the received signals and determines control signals to send to the engine.

Aircraft engines often include moveable components to adjust the operation of the engine. The moveable components are positioned by actuators. It is critical that the actuators position the moveable components accurately and, if not, that the failure of an actuator to position a moveable component accurately be detected and annunciated to a control or monitoring system, for example, a FADEC. An example of a moveable aircraft component is a variable area fan nozzle (VAFN) door. Moving a VAFN door changes the fan nozzle area to improve engine efficiency over a range of operating conditions. VAFN doors are typically employed in pairs, with one on either side of the aircraft engine. The VAFN doors must work together for effective control of the fan nozzle area.

Reliability requirements for aircraft actuation control systems are being driven to higher and higher levels in a continuous effort to improve aircraft safety. For example, requirements for VAFN control systems may permit no more than three control position failures per one million engine flight hours and no more than one unannunciated control position failure per ten billion engine flight hours. These stringent requirements necessitate robust, fault-tolerant designs for aircraft actuation control systems.

SUMMARY

One embodiment of the present invention is a dual redundant actuation control system for controlling a plurality of actuators for positioning a plurality of moveable aircraft components. The actuation control system includes a component controller. The component controller includes two component control channels. Each of the plurality of actuators is electrically connected to each of the two component control channels such that either of the two component control channels may control any or all of the plurality of actuators.

DETAILED DESCRIPTION

Figure 1:
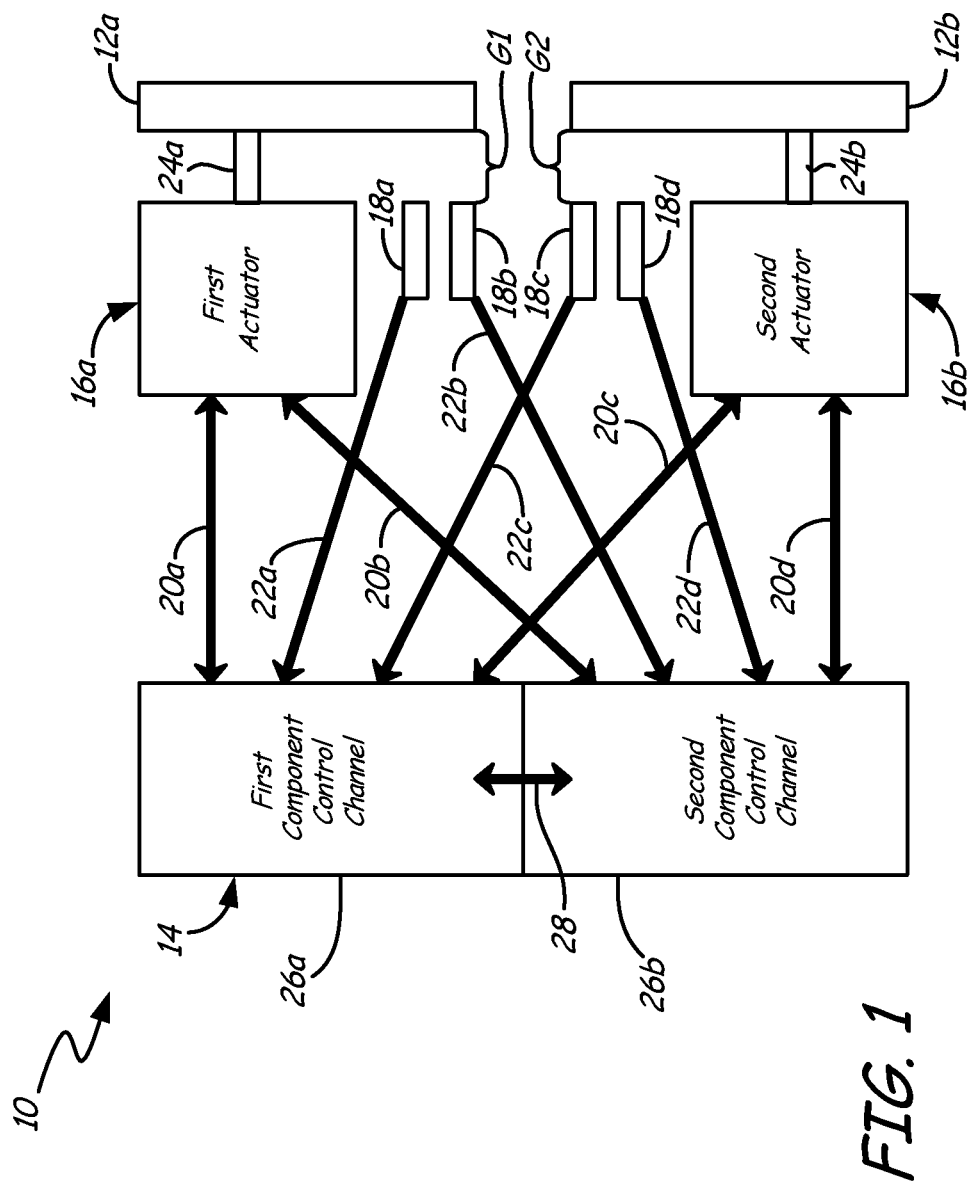
FIG. 1 is a block diagram illustrating an embodiment of the present invention of a dual redundant actuation control system for positioning moveable aircraft components.

The present invention is an actuation control system employing dual redundant electrical components, sensors, and electrical connections to achieve stringent reliability requirements. FIG. 1 is a block diagram illustrating an embodiment of the present invention of a dual redundant actuation control system for positioning moveable aircraft components. FIG. 1 represents an actuation control system with redundant component control channels, actuator control connections, and proximity sensor connections such that the system functions with the loss of a component control channel, an actuator control connection, or a proximity sensor connection. As shown in FIG. 1, actuation control system 10 controls the position of moveable aircraft components 12a-12b. Moveable aircraft components 12a-12b are, for example, VAFN doors as part of a VAFN actuation system on an aircraft engine. Actuation control system 10 includes component controller 14, first actuator 16a, second drive actuator 16b, proximity sensors 18a-18d, actuation control connections 20a-20d, and proximity sensor connections 22a-22d. First actuators 16a includes shaft 24a; second actuator 16b includes shaft 24b. Component controller 14 includes first component control channel 26a, second component control channel 26b, and channel communication link 28. Component control channels 26a-26b are any sort of electronic control system, e.g. proportional, proportional integral, proportional derivative, proportional integral derivative, etc. Component control channels 26a-26b are logically separate and able to function completely independently from each other. Channel communication link 28 is a galvanically isolated data bus. Actuators 16a-16b are described in detail below in reference to FIG. 2.

As illustrated in FIG. 1, actuators 16a-16b are physically connected to moveable aircraft components 12a-12b by shafts 24a-24b, respectively. Actuator 16a has two, redundant control connections to component controller 14. Actuator 16a is electrically connected to first component control channel 26a by actuation control connection 20a and to second component control channel 26b by actuation control connection 20b. Similarly, actuator 16b has identical redundant control connections to component controller 14. Actuator 16b is electrically connected to first component control channel 26a by actuation control connection 20c and to second component control channel 26b by actuation control connection 20d. Channel communication link 28 connects first component control channel 26a and second component control channel 26b. Proximity sensors 18a and 18c are electrically connected to first component control channel 26a by proximity sensor connections 22a and 22c, respectively. Proximity sensors 18b and 18d are electrically connected to second component control channel 26b by proximity sensor connections 22b and 22d, respectively. Actuator control connections 20a-20d are typically two-way connections for control commands going to actuators 16a-16b and status information about actuators 16a-16b coming from actuators 16a-16b. Proximity sensor connections 22a-22d are typically one way connections for sensor measurements coming from proximity sensors 18a-18d.

Positioning of moveable aircraft components 12a-12b is measured by proximity sensors 18a-18d. Proximity sensors 18a-18b measure distance G1 between moveable aircraft component 12a and proximity sensors 18a-18b. The measurement of distance G1 is communicated from proximity sensors 18a-18b to first component control channel 26a and second component control channel 26b, respectively, over proximity sensor connections 22a-22b. Similarly, proximity sensors 18c-18d measure distance G2 between moveable aircraft component 12b and proximity sensors 18c-18d. The measurement of distance G2 is communicated from proximity sensors 18c-18d to first component control channel 26a and second component control channel 26b, respectively, over proximity sensor connections 22c-22d. Component controller 14 employs the measurements received from proximity sensors 18a-18d to control actuators 16a-16b.

Figure 2:
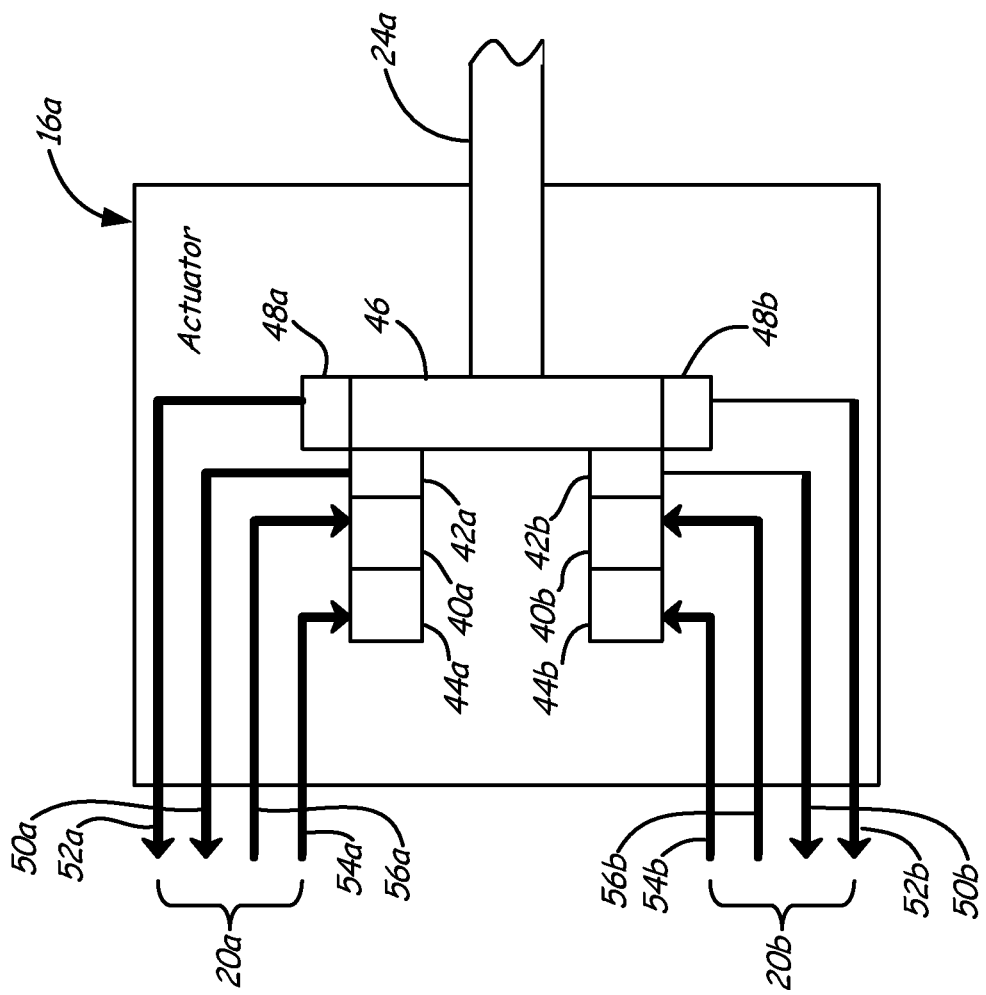
FIG. 2 is a block diagram illustrating the actuators shown in FIG. 1.

FIG. 2 shows actuator 16a. For ease of illustration, only actuator 16a is shown and described, however, it is understood that 16b is essentially identical in description and function. Actuator 16a includes motors 40a-40b, resolvers 42a-42b, brakes 44a-44b, summing gearbox 46, and gearbox sensors 48a-48b. Actuation control connection 20a includes resolver output connection 50a, gearbox sensor connection 52a, brake input connection 54a, and motor input connection 56a. Similarly, actuation control connection 20b includes resolver output connection 50b, gearbox sensor connection 52b, brake input connection 54b, and motor input connection 56b. Gearbox sensors 48a-48b are any type of sensor for gear movement, for example, a rotary variable differential transformer (RVDT), a linear variable differential transformer (LVDT), and a rotary encoder.

Motors 40a-40b each attach to opposite sides of summing gearbox 46. Shaft 24a attaches to summing gearbox 46 between motors 40a-40b such that, through gearing within summing gearbox 46, the rotation of motors 40a-40b combine to produce motion in shaft 24a. Resolvers 42a-42b are attached to motors 40a-40b, respectively, to produce measurement outputs corresponding to the angle of rotation of attached motors 40a-40b. Brakes 44a-44b are also attached to motors 40a-40b, respectively, and, when activated, function to stop rotation of attached motors 40a-40b. Brakes 44a-44b are "failsafe" in that they activate when unpowered. Thus, in the event of a power failure to actuator control system 10, moveable aircraft components 12a-12b lock in position and do not move in an uncontrolled fashion. Gearbox sensors 48a-48b measure movement of gears within summing gearbox 46, with gearbox sensor 48a measuring movement of a gear resulting from attached motor 40a and sensor 48b measuring movement of a gear resulting from attached motor 40b.

Resolver output connections 50a-50b of actuation control connections 20a-20b electrically connect resolver 42a to first component control channel 26a and resolver 42b to second component control channel 26b. Similarly, gearbox sensor connections 52a-52b electrically connect gearbox sensors 48a-48b to first component control channel 26a and second component control channel 26b, respectively. Brakes 44a-44b and motors 40a-40b connect to first component control channel 26a and to second component control channel 26b by brake input connections 54a-54b, and motor input connections 56a-56b.

Considering FIGS. 1 and 2 together, under normal operation, each component control channel 26a and component control channel 26b controls half of actuator 16a (and likewise, actuator 16b). Component control channel 26a, in response to a desired position for moveable aircraft component 12a and position information received from proximity sensor 18a, commands actuator 16a to move moveable aircraft component 12a by supplying power to brake 44a over brake input connection 54a, causing brake 44a to release; and supplying power to motor 40a over motor input connection 56a, causing motor 40a to rotate. Simultaneously, component control channel 26b, in response to the same desired position for moveable aircraft component 12a and position information received from proximity sensor 18b, supplies power to brake 44b over brake input connection 54b and to motor 40b over motor input connection 56b, causing motor 40b to rotate. Rotation of motors 40a-40b combine in summing gearbox 46 to produce movement of shaft 24a, moving moveable aircraft component 12a. The movement of moveable aircraft component 12a by shaft 24a may be by, for example, rotation, linear translation, or a combination of movements, depending on the requirements for the specific application. Once proximity sensor 18a indicates the desired position for moveable aircraft component 12a has been reached, component control channel 26a stops providing power to brake 44a and motor 40a, stopping rotation of motor 40a and preventing further rotation by the application of brake 44a. Component control channel 26b stops rotation of motor 40b in the same manner, once proximity sensor 18b indicates the desired position for moveable aircraft component 12a has been reached. Application of brakes 44a-44b together locks summing gearbox 46 and prevents further movement of shaft 24a and attached moveable aircraft component 12a.

Status information concerning actuator 16a is sent from actuator 16a to each of component control channels 26a-26b over actuator control connection 20a-20b, respectively. The health of motors 40a-40b is monitored by measurement outputs of resolvers 42a-42b transmitted to component control channels 26a-26b over resolver output connections 50a-50b, respectively. Should the rotation measurement of resolvers 42a-42b not match expected values based the power supplied to motors 40a-40b, a health problem with motors 40a-40b would be identified. Similarly, should the gear movement measurements of gearbox sensor 48a-48b transmitted to component control channels 26a-26b over gearbox sensor connections 52a-52b not match expected values based on the rotation measurement of resolvers 42a-42b and position measurements from proximity sensors 18a-18b, a problem with gearbox 46 or connections between gearbox 46 and shaft 24a or between shaft 24a and moveable aircraft component 12a would be identified.

In the event of a failure of one of component control channels 26a-26b, the actuation control system 10 is still able to function adequately. For example, failure of component control channel 26a results in no commands being sent to actuator 16a from component control channel 26a; no power is provided to brake 44a or motor 40a, thus stopping rotation of motor 40a and preventing further rotation by the application of brake 44a. However, component control channel 26b still operates as described above to send commands to actuator 16a. Motor 40b and brake 44b operate in response to commands from component control channel 26b sent over actuation control connection 20b. Motor 40b imparts rotation into summing gearbox 46 resulting in movement of shaft 24a until moveable aircraft component 12a is positioned as desired as indicated by proximity sensor 18b. Because only one of motors 40a-40b contributes to summing gearbox 46, the speed of movement of shaft 24a is about half of what it would normally be, but this is adequate for many moveable aircraft components, for example, VAFN doors. Component control channel 26a is similarly able to control actuator 16a in the event of the failure of component control channel 26b.

In addition to being fault tolerant with respect to a failure of either of component control channels 26a-26b, the present invention is similarly fault tolerant with respect to a failure of one of any of redundant sensors, electrical components and electrical connections necessary for control of moveable aircraft component 12a, such as proximity sensors 18a-18b, actuation control connections 20a-20b, proximity sensor connections 22a-22b, motors 40a-40b, resolvers 42a-42b, brakes 44a-44b, and gearbox sensors 48a-48b. Actuation control system 10 is able to maintain control of actuator 16a, and moveable aircraft component 12a should any one of these fail. Similarly, actuation control system 10 is able to maintain control of actuator 16b and moveable aircraft component 12b should any of the similar redundant sensors, electrical components and electrical connections necessary for control of moveable aircraft component 12b fail, such as proximity sensors 18c-18d, actuation control connections 20c-20d, proximity sensor connections 22c-22d, and redundant components within actuator 16b. Finally, because the position of each moveable aircraft component 12a-12b is measured by two proximity sensors 18a-18b and 18c-18d, respectively, each with its own dedicated proximity sensor connection 22a-22d, to each of component control channels 26a-26b, the actuation control system of the present invention reduces the probability of an unannunciated out of position error for moveable aircraft components 12a-12b. Should any one of these components fail, a path still exists to report a position failure.

This embodiment of the present invention achieves improved system reliability because both actuators 16a-16b have dual redundant actuator control connections 20a-20b, 20c-20d, respectively, to each of first component control channel 26a and second component control channel 26b. Thus, either of first component control channel 26a and second component control channel 26b can control either or both of actuators 16a-16b. Normally, for the fastest control response, each of first component control channel 26a and second component control channel 26b control half of each of actuators 16a-16b as described above. The health of each of first component control channel 26a and second component control channel 26b is communicated to the other of first component control channel 26a and second component control channel 26b over channel communication link 28. However, acceptable control performance is achieved even when both actuators 16a-16b are controlled by the same one of first component control channel 26a and second component control channel 26b. Should one of first component control channel 26a and second component control channel 26b fail, the remaining healthy one of first component control channel 26a and second component control channel 26b is able to continue safely controlling actuators 16a-16b to properly position moveable aircraft components 12a-12b. Similarly, should one of the dual redundant electrical components, sensors, and electrical connections necessary for control of moveable aircraft components 12a-12b fail, the remaining healthy redundant sensor, electrical component or electrical connection is able to support the continued safe control of moveable aircraft components 12a-12b.

Figure 3:
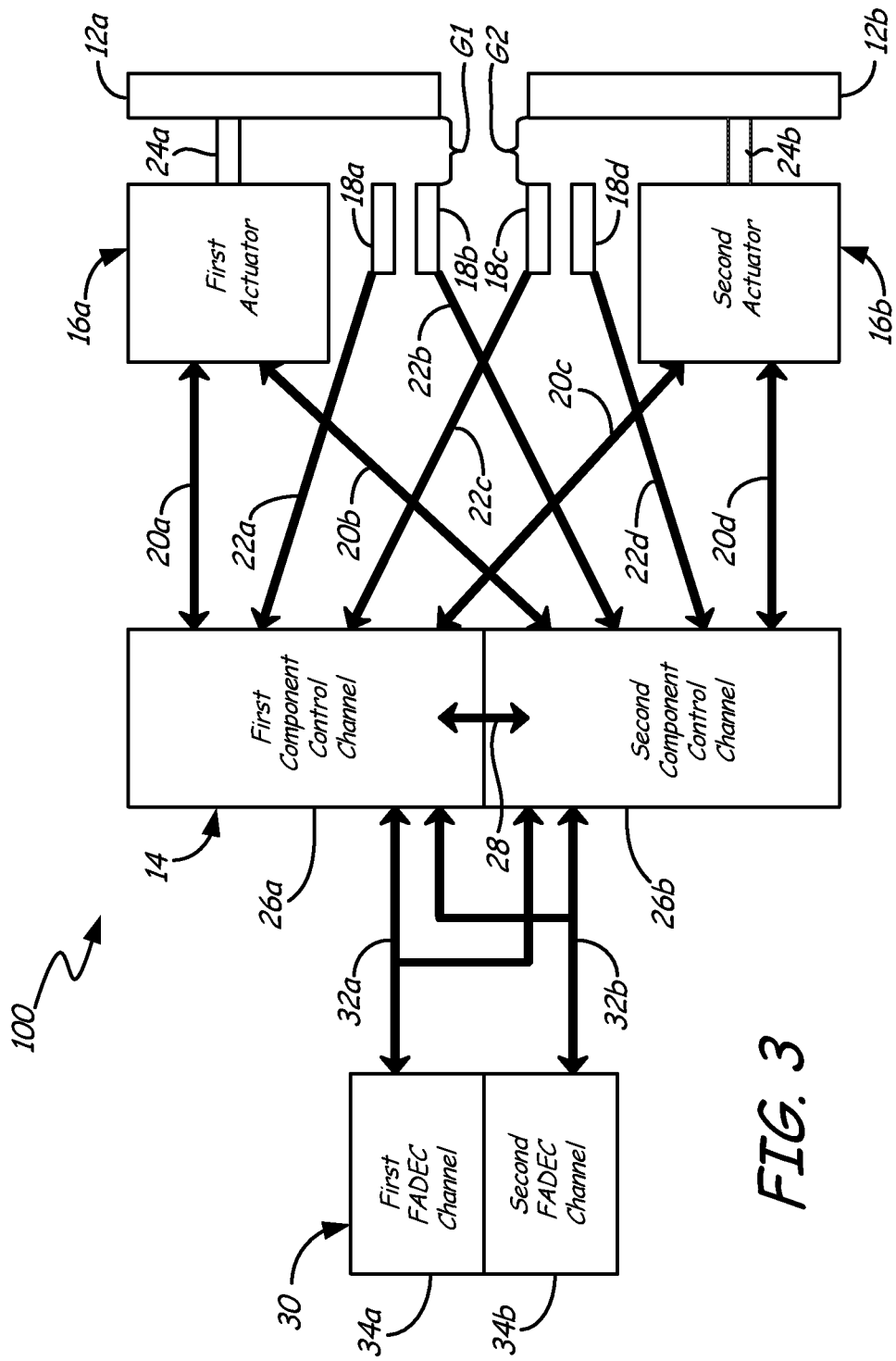
FIG. 3 is a block diagram illustrating another embodiment of the present invention of a dual redundant actuation control system for positioning moveable aircraft components including a dual channel FADEC.

The embodiment of the present invention illustrated in FIGS. 1 and 2 improves actuation control system reliability by employing a component controller with dual redundant control channels, dual redundant actuator control connections, and dual redundant proximity sensors and sensor connections. FIG. 3 is a block diagram illustrating another embodiment of the present invention of a dual redundant actuation control system for positioning moveable aircraft components including a dual channel Full Authority Digital Engine Control (FADEC). This embodiment is identical to that shown in FIGS. 1 and 2, except for the addition of a dual channel FADEC and redundant component controller connections such that the system also functions with the loss of a FADEC channel or a component controller connection. All identically numbered components and their features are as described above with reference to FIGS. 1 and 2. As shown in FIG. 3, actuation control system 100 controls the positioning of moveable aircraft components 12a-12b and includes FADEC 30 and component controller connections 32a-32b. FADEC 30 includes first FADEC channel 34a, and second FADEC channel 34b. Component controller connections 32a-32b are multi-drop data buses, for example, CAN, MIL-STD-1553B, ARINC 429 and ARINC 825.

As illustrated in FIG. 3, component controller 14 has two, redundant control connections to FADEC 30. Each of first component control channel 26a and second component control channel 26b of component controller 14 is electrically connected to first FADEC channel 34a by component controller connection 32a and to second FADEC channel 34b by component controller connection 32b.

In operation, FADEC 30 directs component controller 14 to position moveable aircraft components 12a-12b as necessary for a desired level of engine performance. FADEC 30 communicates the desired position information from each of first FADEC channel 34a and second FADEC channel 34b to component controller 14 over component controller connections 32a-32b, respectively. Component controller 14 employs the desired position information to command actuators 16a-16b as described above in reference to FIGS. 1 and 2. The redundant nature of component controller connections 32a-32b result in both component control channels 26a-26b receiving the desired position information regardless of which FADEC channel 34a-34b sends the information. Thus, should one of FADEC channels 34a-34b fail, or one of component controller connections 32a-32b fail, the surviving one of FADEC channels 34a-34b or component controller connections 32a-32b still controls both component control channels 26a-26b of component controller 14. Should either one of FADEC channels 34a-34b, or either one of component controller connections 32a-32b fail; and either one of component control channels 26a-26b fail, full control of moveable aircraft components 12a-12b is maintained through the surviving FADEC channel/component controller connection combination and the surviving component control channel.

Status information, including the health of component controller 14 and its two channels, as well as position information from proximity sensors 18a-18d and status information from actuators 16a-16b, is communicated from component controller 14 to FADEC 30 over FADEC channels 34a-34b. In addition, this embodiment of the present invention enables a Built-In Test (BIT) function by sending a test message from, for example, FADEC channel 34a over component controller connection 32a to component controller channel 26a and on to component controller channel 26b over channel communication link 28. The test message returns to FADEC channel 34a from component controller channel 26b over component controller connection 32a where FADEC 30 compares the returning message with the original test message to measure the health of component controller 14 and component controller connection 32a.

In the unlikely event that both FADEC channels 34a-34b fail, component controller 14 commands actuators 16a-16b to drive moveable aircraft components 12a-12b to a predetermined "failsafe" position stored within component controller 14. This "failsafe" position for moveable aircraft components 12a-12b is one where the aircraft can safely function under all conditions, albeit with reduced functionality or efficiency. Because of the dual redundant design of the embodiment of the present invention shown in FIG. 3, either or both of component control channels 26a-26b can command both actuators 16a-16b to drive moveable aircraft components 12a-12b to the failsafe position.

For ease of illustration, for all embodiments, only two actuators are shown, but it is understood that the invention is not limited to two actuators and applies to a plurality of actuators.

The actuation control system of the present invention provides several advantages. The actuation control system has dual redundant electrical components, sensors, and electrical connections and is robust and fault tolerant to achieve stringent reliability requirements necessary for controlling movement of moveable aircraft components on an aircraft engine. Each of a plurality of actuators has dual redundant control connections to a dual-channel component controller, such that either of the component control channels can control any or all of the plurality of actuators. Should a channel of the component controller fail, the remaining channel can safely control the actuators. In addition to being fault tolerant with respect to a failure of either of the component control channels, the present invention is similarly fault tolerant with respect to a failure of one of any of redundant sensors and electrical connections necessary for control of the moveable aircraft components, such as proximity sensors, actuation control connections, proximity sensor connections, motors, resolvers, brakes, and gearbox sensors. Also, because the position of each moveable aircraft component is measured by two proximity sensors, each with its own dedicated proximity sensor connection to each of the component control channels, the actuation control system of the present invention reduces the probability of an unannunciated out of position error of the moveable aircraft components. Should any one of these components fail, a path still exists to report a position failure. This is the case all the way to the FADEC, with the dual channel FADEC and redundant component controller connections providing multiple paths for information from the actuators, as well as commands from the FADEC to the component controller.

Another advantage of the present invention is the "failsafe" feature of the component controller. The component controller has a built-in failsafe position for the moveable aircraft components stored in each component controller channel. This failsafe position for the moveable aircraft components is one in which the aircraft can safely function under all conditions, albeit with reduced functionality or efficiency. Because of the dual redundant design of the present invention, either or both of the component control channels can command all actuators to drive the moveable aircraft components to the failsafe position.

Finally, the dual channel FADEC and the dual channel component controller with a channel communication link provide built-in test functionality for testing the component controller, the channel communication link, and the component controller connections to the FADEC.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A dual redundant actuation control system for controlling a plurality of actuators for positioning a plurality of moveable aircraft components, the system comprising:
   a component controller comprising two component control channels;
   wherein each of the plurality of actuators is electrically connected to each of the two component control channels such that either of the two component control channels may control any or all of the plurality of actuators; and
   a full authority digital engine controller (FADEC) electrically connected to the component controller, the FADEC comprising two channels;
   wherein each of the two FADEC channels is electrically connected to each of the two control channels such that either or both of the two FADEC channels may communicate with either or both of the two control channels for providing command instructions to the component controller and for receiving status information from the component controller.

2. The system of claim 1, wherein the component controller controls each of the two actuators to drive the plurality of moveable aircraft components to failsafe positions in response to a failure to receive command instructions from the FADEC.

3. The system of claim 1, wherein each of the two FADEC channels comprise a multi-drop digital bus.

4. The system of claim 1, wherein the plurality of moveable aircraft components consist of a pair of variable area fan nozzle doors for varying the fan nozzle cross-sectional area of an aircraft engine.

5. The system of claim 1, wherein the plurality of moveable aircraft components each comprise a variable area fan nozzle door for varying the fan nozzle cross-sectional area of an aircraft engine.

6. A variable area fan nozzle actuation system for an aircraft engine comprising:
   a variable area fan nozzle (VAFN) for varying the fan nozzle cross-sectional area of the aircraft engine, the VAFN comprising:
      a first VAFN door; and
      a second VAFN door; and
   a control system for controlling the position of the VAFN doors, the control system comprising:
      a first actuator attached to the first VAFN door for moving the first VAFN door;
      a second actuator attached to a second VAFN door for moving the second VAFN door;
      a VAFN controller linked to each of the first actuator and the second actuator, the VAFN controller comprising:
         a first VAFN control channel;
         a second VAFN control channel; and
         a channel communication link;
      wherein the first VAFN control channel is electrically connected to each of the first actuator and the second actuator to communicate control information between the VAFN controller and the first and second actuators; and the second VAFN control channel is electrically connected to each of the first actuator and the second actuator to communicate control information between the VAFN controller and the first and second actuators;
      wherein at least one of the VAFN control channels controls the first actuator and the same at least one of the VAFN control channels controls the second actuator.

7. The variable area fan nozzle actuation system of claim 6, further comprising:
   a first proximity sensor for sensing a position of the first VAFN door; and
   a second proximity sensor for sensing a position of the second VAFN door;
   wherein the first proximity sensor is electrically connected to each of the first VAFN control channel and the second VAFN control channel for providing information on the position of the first VAFN door to the VAFN controller; and the second proximity sensor is electrically connected to each of the first VAFN control channel and the second VAFN control channel for providing information on the position of the second VAFN door to the VAFN controller;

wherein at least one of the VAFN control channels controls the first actuator at least partially in response to the information on the position of the first VAFN door; and the same at least one of the VAFN control channels controls the second actuator at least partially in response to the information on the position of the second VAFN door.

8. The variable area fan nozzle actuation system of claim 6, further comprising:

a full authority digital engine controller (FADEC) electrically connected to the VAFN controller, the FADEC comprising:
 a first engine control channel; and
 a second engine control channel;
wherein the first engine control channel is electrically connected to each of the first VAFN control channel and the second VAFN control channel; and the second engine control channel is electrically connected to each of the first VAFN control channel and the second VAFN control channel;
wherein the FADEC provides command instructions to the VAFN controller and receives status information from the VAFN controller by employing at least one of the first engine control channel and the second communication channel.

9. The variable area fan nozzle actuation system of claim 8, wherein the VAFN controller controls the first actuator to drive the first VAFN door to a failsafe position, and the VAFN controller controls the second actuator to drive the second VAFN door to a failsafe position in response to a failure to receive command instructions from the FADEC.

10. The variable area fan nozzle actuation system of claim 8, wherein the first engine control channel and the second engine control channel each comprise a multi-drop digital bus.

11. The variable area fan nozzle actuation system of claim 6, wherein:

the first actuator comprises:
 a first drive motor electrically connected to the first VAFN control channel;
 a first brake physically connected to the first drive motor, and electrically connected to the first VAFN control channel;
 a second drive motor electrically connected to the second VAFN control channel;
 a second brake physically connected to the second drive motor, and electrically connected to the second VAFN control channel; and
 a first summing gearbox physically connected to each of the first drive motor and the second drive motor and physically connected to a first shaft attached to the first VAFN door;
 wherein at least one of the first drive motor and the second drive motor operate through the first summing gearbox to move the first VAFN door in response to control information from the VAFN controller, and the first brake and the second brake operate on their respective connected drive motor to halt movement of their respective connected drive motor in response to control information from the VAFN controller; and
the second actuator comprises:
 a third drive motor electrically connected to the first VAFN control channel;
 a third brake physically connected to the third drive motor, and electrically connected to the first VAFN control channel;
 a fourth drive motor electrically connected to the second VAFN control channel;
 a fourth brake physically connected to the fourth drive motor, and electrically connected to the second VAFN control channel; and
 a second summing gearbox physically connected to each of the third drive motor and the fourth drive motor and physically connected to a second shaft attached to the second VAFN door;
 wherein at least one of the third drive motor and the fourth drive motors operate through the second summing gearbox to move the second VAFN door in response to control information from the VAFN controller, and the third brake and the fourth brake operate on their respective connected drive motor to halt movement of their respective connected drive motor in response to control information from the VAFN controller.

12. The variable area fan nozzle actuation system of claim 11, wherein:

the first drive motor comprises a first resolver for measuring rotational position of the first drive motor, wherein the rotational position is communicated to the first VAFN control channel;
the second drive motor comprises a second resolver for measuring rotational position of the second drive motor, wherein the rotational position is communicated to the second VAFN control channel;
the third drive motor comprises a third resolver for measuring rotational position of the third drive motor, wherein the rotational position is communicated to the first VAFN control channel; and
the fourth drive motor comprises a fourth resolver for measuring rotational position of the fourth drive motor, wherein the rotational position is communicated to the second VAFN control channel.

13. The variable area fan nozzle actuation system of claim 12, wherein the control information from the VAFN controller causing any of the first, second, third, and fourth brakes to halt movement of their respective connected drive motor is determined at least partially from the rotational position measured by the resolver for the drive motor.

14. The variable area fan nozzle actuation system of claim 11, wherein, the first actuator further comprises:
 a first gearbox sensor electrically connected to the first VAFN control channel and physically connected to the first summing gearbox for measuring rotational position of the first drive motor, wherein the rotational position is provided to the first VAFN control channel;
 a second gearbox sensor electrically connected to the second VAFN control channel and physically connected to the first summing gearbox for measuring rotational position of the second drive motor, wherein the rotational position is provided to the second VAFN control channel;
the second actuator further comprises:
 a third gearbox sensor electrically connected to the first VAFN control channel and physically connected to the second summing gearbox for measuring rotational position of the third drive motor, wherein the rotational position is provided to the first VAFN control channel;

a fourth gearbox sensor electrically connected to the second VAFN control channel and physically connected to the second summing gearbox for measuring rotational position of the fourth drive motor, wherein the rotational position is provided to the second VAFN control channel;

wherein the VAFN controller controls the first actuator at least partially in response to the rotational position measurements of the first and second gearbox sensors of the first summing gearbox; and the VAFN controller controls the second actuator at least partially in response to the rotational position measurements of the third and fourth gearbox sensors of the second summing gearbox.

15. The variable area fan nozzle actuation system of claim 14, wherein the control information from the VAFN controller causing any of the first, second, third, and fourth brakes to halt movement of their respective connected drive motor is determined at least partially from the rotational position measured by the gearbox sensor for the drive motor.

16. The variable area fan nozzle actuation system of claim 15, wherein the first, second, third, and fourth gearbox sensors comprise at least one of a rotary variable differential transformer, a linear variable differential transformer, and a rotary encoder.

17. A method of controlling an actuator for positioning a moveable aircraft component, the method comprising:
    connecting electrically a first component channel of a component controller to an actuator attached to the moveable aircraft component;
    connecting electrically a second component channel of the component controller to the actuator;
    detecting a position of the moveable aircraft component with a first position sensor and a second position sensor; and
    controlling the actuator in response to the detected position of the moveable aircraft component, wherein controlling the actuator comprises:
        controlling a first portion of the actuator with the first component channel in response to the position detected by the first position sensor; and
        controlling a second portion of the actuator with the second component channel in response to the position detected by the second position sensor.

18. The method of claim 17, wherein controlling the first portion of the actuator with the first component channel comprises braking the first portion of the actuator.

* * * * *